(12) United States Patent
Weidel

(10) Patent No.: US 8,127,333 B2
(45) Date of Patent: Feb. 28, 2012

(54) DEVICE FOR IMAGING AN AIRCRAFT CABIN

(75) Inventor: Michael Weidel, Giesen (DE)

(73) Assignee: Airbus Operations GmbH (DE)

( * ) Notice: Subject to any disclaimer, the term of this patent is extended or adjusted under 35 U.S.C. 154(b) by 401 days.

(21) Appl. No.: 12/288,678

(22) Filed: Oct. 22, 2008

(65) Prior Publication Data

US 2009/0113494 A1   Apr. 30, 2009

Related U.S. Application Data

(60) Provisional application No. 61/000,339, filed on Oct. 25, 2007.

(30) Foreign Application Priority Data

Oct. 25, 2007 (DE) .......................... 10 2007 051 196

(51) Int. Cl.
*H04N 7/18* (2006.01)
*G01M 17/00* (2006.01)
*G06F 7/00* (2006.01)
*G06F 19/00* (2011.01)

(52) U.S. Cl. .......................................... 725/76; 701/35

(58) Field of Classification Search ...................... 725/76
See application file for complete search history.

(56) References Cited

U.S. PATENT DOCUMENTS

| 6,929,218 B1 | 8/2005 | Sanford et al. |
|---|---|---|
| 2003/0160706 A1 | 8/2003 | Endress et al. |
| 2004/0017782 A1 | 1/2004 | Chen et al. |

FOREIGN PATENT DOCUMENTS

| CA | 2 433 480 | 1/2004 |
|---|---|---|
| DE | 197 05 643 A1 | 8/1998 |
| DE | 197 32 806 A1 | 2/1999 |
| DE | 102 07 641 A1 | 9/2003 |
| EP | 1 338 507 A2 | 8/2003 |
| EP | 1 378 447 A1 | 1/2004 |
| WO | WO-03/058571 A1 | 7/2003 |
| WO | WO-2004/074097 A1 | 9/2004 |

*Primary Examiner* — Dominic D Saltarelli
(74) *Attorney, Agent, or Firm* — Lerner, David, Littenberg, Krumholz & Mentlik, LLP

(57) ABSTRACT

A service network in which a monitoring system is implemented under the aspect of weight and space optimization. The service network for an aircraft includes a multi-purpose flight attendant panel, a bus system and a switch, wherein the multi-purpose flight attendant panel and the switch are connected via the bus system, wherein the switch includes an interface for at least one recording device, and wherein the multi-purpose flight attendant panel includes a control device for controlling the recording device.

9 Claims, 3 Drawing Sheets

DEVICE FOR IMAGING AN AIRCRAFT CABIN

CROSS-REFERENCE TO RELATED APPLICATIONS

This application claims the benefit of the filing date of U.S. Provisional Patent Application No. 61/000,339 filed Oct. 25, 2007 and of German Patent Application No. DE 10 2007 051 196.7 filed Oct. 25, 2007, the disclosures of which are hereby incorporated herein by reference.

BACKGROUND OF THE INVENTION

The present invention relates to a device for imaging an aircraft cabin, particularly to a service network for an aircraft with a device for imaging the aircraft cabin.

In modern commercial aircraft, a service network is provided that is generally also referred to as Cabin Intercommunication Data System (CIDS). Such a service network makes it possible to operate and control various cabin functions such as illumination, ventilation, entertainment systems, etc., by a so-called Multi Purpose-Flight Attendant Panel (MP-FAP). Newer generations of commercial aircraft are furthermore provided with a so-called Cabin Video Monitoring System (CVMS) that makes it possible to monitor the cabin. This cabin monitoring is particularly important for unforeseen events such as, for example, a hijacking because it enables, for example, a special unit to survey the current cabin situation in an unnoticed fashion in order to obtain advance information on the situation in the aircraft for a possibly planned mission. For this purpose, the cabin video monitoring system is also provided, for example, with a ground control device that is also referred to as Ground Service Panel (GSP) and enables, for example, a special unit to access the cabin video monitoring system.

In order to ensure these functions, substantial expenditures are required in an aircraft such as, for example, the additional wiring expenditure for realizing an energy supply, an activation or a video transmission of a cabin video monitoring system. Furthermore, expensive and heavy data processing devices are also required in an aircraft such as, for example, a distribution unit that is also referred to as Area Distribution Unit (ADU) or a so-called Data Acquisition Unit (DAU).

According to the relevant state of the art, DE 197 32 806 A1 discloses, for example, a monitoring device for the interiors of aircraft that is realized in the form of a stand-alone monitoring unit in addition to a CIDS.

Furthermore, DE 102 07 641 A1 discloses an information and display device for a service unit of a passenger aircraft that essentially corresponds to a CIDS, wherein this information and display device also fulfills, in particular, an entertainment function for passengers.

Furthermore, DE 197 05 643 A1 discloses a wire-bound transmission system for aircraft that, in essence, also corresponds to a CIDS.

Furthermore, EP 1 378 447 A1 discloses a monitoring system for an aircraft that is provided in addition to a CIDS, wherein the monitoring system allows a data communication between a ground station and the aircraft.

Furthermore, U.S. Pat. No. 6,929,218 B1 discloses a modularized, integrated seat structure that essentially fulfills the function of a CIDS or an entertainment system, respectively.

SUMMARY OF THE INVENTION

The present invention provides the functions of a service network and of a monitoring system under the aspect of weight and space optimization.

The present invention provides a service network for an aircraft with a multi-purpose flight attendant panel, a bus system and a switch, wherein the multi-purpose flight attendant panel and the switch are connected via the bus system, wherein the switch features an interface for at least one recording device, and wherein the multi-purpose flight attendant panel features a control device that is designed for controlling the recording device.

Due to these measures, a system is made available that fulfills the function of a conventional cabin intercommunication data system (CIDS), as well as the function of a cabin video monitoring system (CVMS). This furthermore makes it possible to utilize the existing infrastructure of a cabin intercommunication data system for incorporating the function of the cabin video monitoring system such that substantial weight and cost savings are achieved in comparison with separate systems known from the state of the art. For this purpose, the service network, in particular, is provided with a switch that features an interface for at least one recording device. Furthermore, a control device is provided for controlling the recording device, namely via the bus system. Such a realization makes it possible, in particular, to eliminate a significant number of devices and wires, particularly the wiring for an energy supply and for an activation of the monitoring function.

According to one exemplary embodiment, the bus system consists of an Ethernet bus.

This makes it possible to utilize a standardized bus system for controlling a recording device such as, for example, a video camera with the control device via the bus system and the switch.

According to one exemplary embodiment of the invention, the bus system is wire-bound.

This makes it possible to ensure an increased immunity to interferences and the stipulations of various countries with respect to radio and radiation emissions can simultaneously be observed.

According to one exemplary embodiment of the invention, the recording device consists of a video recording device.

This makes it possible to record moving images, i.e., motion sequences, within the cabin and to continuously monitor the cabin without interruptions. It would also be conceivable to pan the video recording device under the control of the control device. Alternatively or additionally, the video recording device may also feature a zoom, i.e., the option of variable picture detail. The (optical and/or digital) zoom may also be controlled by the control device in this case.

According to one exemplary embodiment of the invention, the control device consists of a memory with video application software.

This makes it possible to realize an optimized control of the recording device, as well as to update the control, in particular, if the recording device is exchanged or supplemented over the course of time and replaced, for example, with a newer or more modern recording device.

According to one exemplary embodiment of the invention, the multi-purpose flight attendant panel features a storage medium for recording data of the recording device.

This makes it possible to record and subsequently retrieve on demand the data made available by the recording device, particularly the images, without having to access the black box in the aircraft that usually is not readily accessible. The storage medium may also be implemented at a different location of the service network.

According to one exemplary embodiment of the invention, the service network furthermore features an additional flight attendant panel.

Due to this measure, the service network can not only be operated by the multi-purpose flight attendant panel, but also a "substation" of a flight attendant panel. The additional flight attendant panel accesses the same bus system as the multi-purpose flight attendant panel and also the switch. The additional flight attendant panel may be used, in particular, for carrying out the control and/or the data storage, namely either alternatively or additionally to that of the multi-purpose flight attendant panel.

According to one exemplary embodiment of the invention, the service network furthermore features a cockpit display device.

Such a cockpit display device enables the pilot or copilot to survey the cabin situation, wherein the cockpit display device may be connected, for example, to the multi-purpose flight attendant panel via a video interface.

According to one exemplary embodiment of the invention, the service network furthermore features a ground service panel that is connected to the bus system, wherein the ground service panel features an interface that allows a data exchange with the ground station.

This makes it possible, for example, to externally access the service network, for example, in order to access the video data stored in the memory of the multi-purpose flight attendant panel. It is furthermore possible to control the recording device itself by the ground service panel, for example, via the switch, wherein it would be possible, for example, to pan a video camera in order to obtain an adequate overview of the current cabin situation, if so required. For example, special units can gain access via the interface of the ground service panel, for example, by a plug connector provided on the outside of the aircraft, such that the special forces are not only able to access all stored data during a ground stop of the aircraft, but also to initiate the acquisition of additional data by controlling the recording device.

According to one exemplary embodiment of the invention, the service network is designed in such a way that the energy supply of the recording device and of the switch is realized in the form of an energy supply via the panel.

This makes it possible to realize an external energy supply, particularly during active access to the recording device via the ground service panel and the switch, without having to provide an energy supply for this purpose in the aircraft. It is furthermore possible to access the recording device via the external energy supply if the on-board energy supply of the aircraft has completely broken down.

According to one exemplary embodiment of the invention, an aircraft is provided with an inventive service network.

In summation, the fundamental idea of the invention can be interpreted as incorporating a cabin video monitoring system (CVMS) into an existing, conventional cabin intercommunication data system (CIDS) in order to reduce the weight and the costs for technical devices.

The individual characteristics naturally can also be combined with one another, wherein advantageous effects may also manifest themselves in certain instances which exceed the sum of the individual effects.

These and other aspects of the present invention are explained and elucidated with reference to the exemplary embodiments described hereafter.

BRIEF DESCRIPTION OF THE DRAWINGS

Exemplary embodiments are described below with reference to the following drawings.

DETAILED DESCRIPTION

Figure 1:
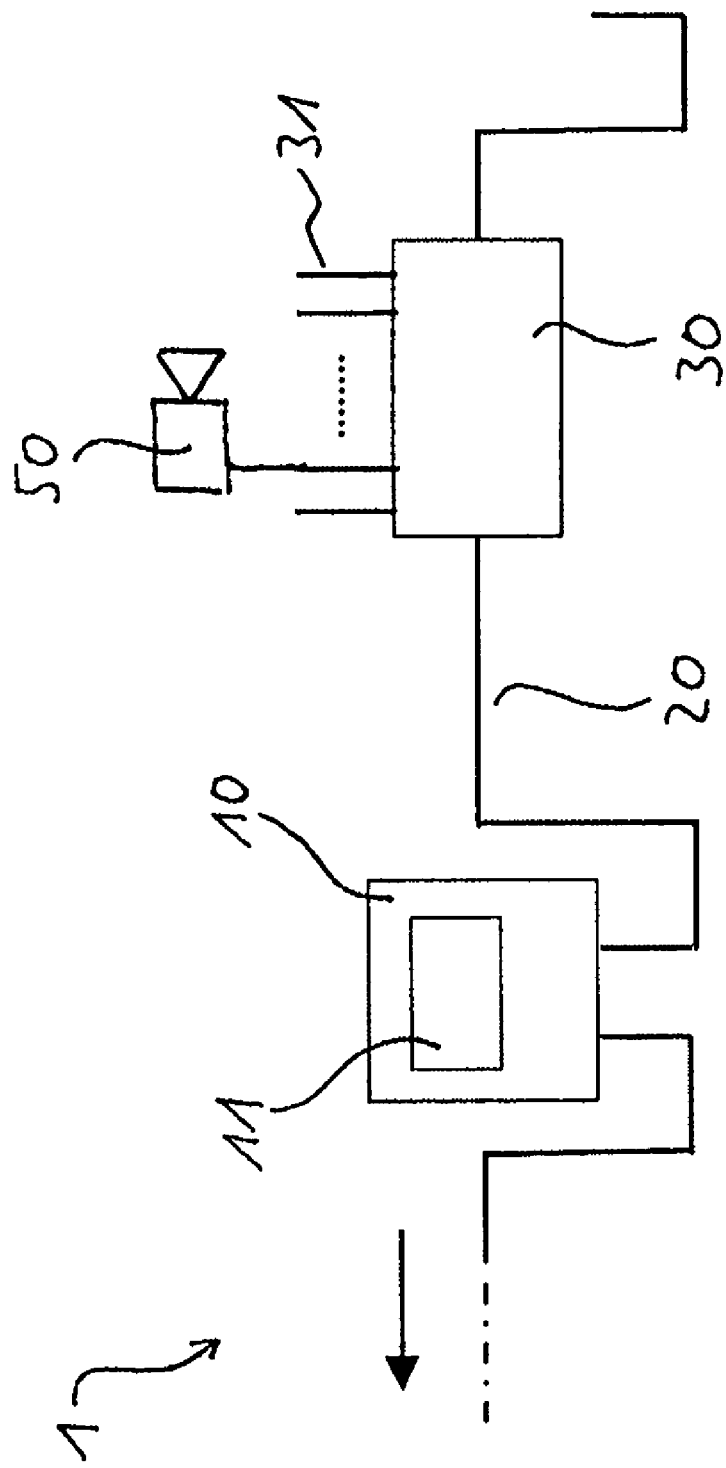
FIG. 1 shows a schematic representation of a service network according to one embodiment of the invention.

FIG. 1 shows a service network 1 for a not-shown aircraft with a multi-purpose flight attendant panel 10, a bus system 20 and a switch 30. The multi-purpose flight attendant panel 10 and the switch 30 are connected via the bus system 20. The switch 30 features an interface 31 for connecting one or more recording devices 50, for example, video cameras, etc. The multi-purpose flight attendant panel 10 furthermore features a control device 11 that is designed for controlling the recording device 50. The service network may consist of a so-called Cabin Intercommunication Data System (CIDS). In this case, the so-called Multi Purpose-Flight Attendant Panel (MP-FAP) 10 serves for adjusting and controlling conventional cabin functions such as, for example, illumination, ventilation and climate-control, but also for passenger feedback such as a seat-specific service request by corresponding passengers. The control device 11 may be realized, in particular, by implementing video application software that controls, for example, a video camera via the bus system 20, wherein the video camera serves as recording device 50 in this case. The switch is able to operate a multitude, for example, of video cameras such as 15 cameras or more depending on how many cameras are required for a sufficiently monitoring the cabin.

Figure 2:
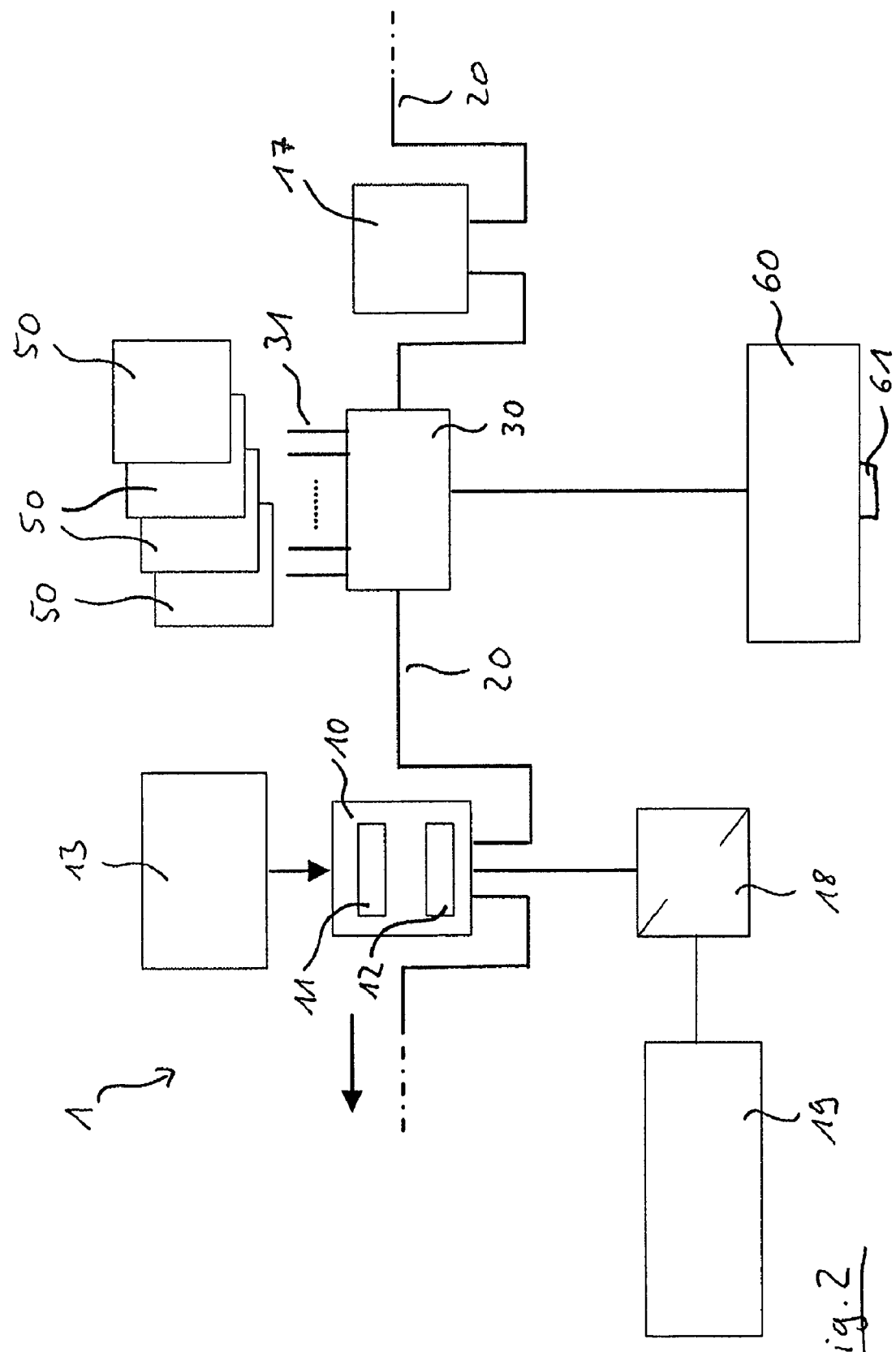
FIG. 2 represents another exemplary embodiment of a service network of the present invention.

FIG. 2 shows another exemplary embodiment of the invention, in which a service network 1 for a not-shown aircraft is illustrated with a multi-purpose flight attendant panel 10, a bus system 20 and a switch 30, wherein the multi-purpose flight attendant panel 10 and the switch 30 are also connected via the bus system 20 in this case. The switch 30 features an interface 31 for at least one recording device 50, wherein the service network, particularly the multi-purpose flight attendant panel 10, features a control device 11 that is once again designed for controlling the recording device 50.

The bus system 20 may consist, for example, of an Ethernet bus system, wherein the bus system 20 may be realized, in particular, in a wire-bound fashion. However, this does not exclude embodiments, in which the bus system 20 consists, for example, of a wireless bus system that communicates in accordance with a radio standard. In this case, however, it needs to be taken into consideration that specific limit values and regulations with respect to radio and radiation emissions need to be observed in certain countries. Naturally, it would also be conceivable to realize an optical transmission, particularly an infrared or laser transmission. The recording devices connected to the switch 30 via the interface 31 may consist, for example, of video recording devices, particularly of video cameras. These video recording devices may be designed, for example, in a movable fashion such that it is not only possible to record the data of the recording device 50 by the control device 11, but also to control, for example, the camera movements in order to include a larger cabin area in the video monitoring.

The control device 11 may consist, for example, of a memory with video application software that can be implemented in the multi-purpose flight attendant panel 10, e.g., via an external source 13 such as a laptop or an external network connection. This software can be updated, for example, in a cyclic fashion so as to ensure that the respectively latest version is installed. The service network and, in particular, the multi-purpose flight attendant panel 10 may feature a storage medium 12 that is designed for recording video data or general data of the recording device 50. However, this storage medium may be alternatively arranged in another flight attendant panel 17 such that the control device 11 and the data recording in a storage medium 12 can be spatially separated from one another. For example, it is also possible to realize a redundant control 11, as well as a redundant data recording in a storage medium 12, by providing a multitude of multi-purpose flight attendant panels 10, 17, e.g., in order to ensure the operatability of the entire system in case one module fails. In this respect, it would be possible to provide, in particular, safety mechanisms that prevent one defective unit in the entire system from affecting the remaining system.

The service network may furthermore be provided with a cockpit display device 19 that can be connected to the service network 1, for example, via a video interface 18. Such a connection can be produced, for example, at a multi-purpose flight attendant panel 10, but also at an additional flight attendant panel 17 or another suitable location in the service network.

The service network may furthermore be equipped with a ground service panel 60 that may either be arranged in one unit together with the switch 30 or spatially separate thereof in another unit. The ground service panel 60 features an interface 61 that allows a data exchange with a not-shown ground station. Although such an exchange is, according to current regulations, only permitted in a wire-bound fashion due to restrictions of radio and radiation emissions, it is naturally also possible to realize a wireless transmission or a wireless data exchange with the ground station. In case of a hijacking, for example, a special unit can access the service network 1 from outside the aircraft 7 via this interface, for example, in order to obtain data from the recording devices 50 via the switch 30. In this case, the system may be designed in such a way that the service network, namely at least the components of the recording device 50, the switch 30 and the ground service panel 60 required for a video transmission, can also be supplied with the required energy for reading data out of the recording devices 50 by an external energy supply via the interface 61.

Naturally, the corresponding system components may also be designed in such a way that the system is automatically booted when it is supplied with energy from an external energy supply in order to also be able to start the monitoring system from outside in case the energy supply of the aircraft completely breaks down.

Figure 3:
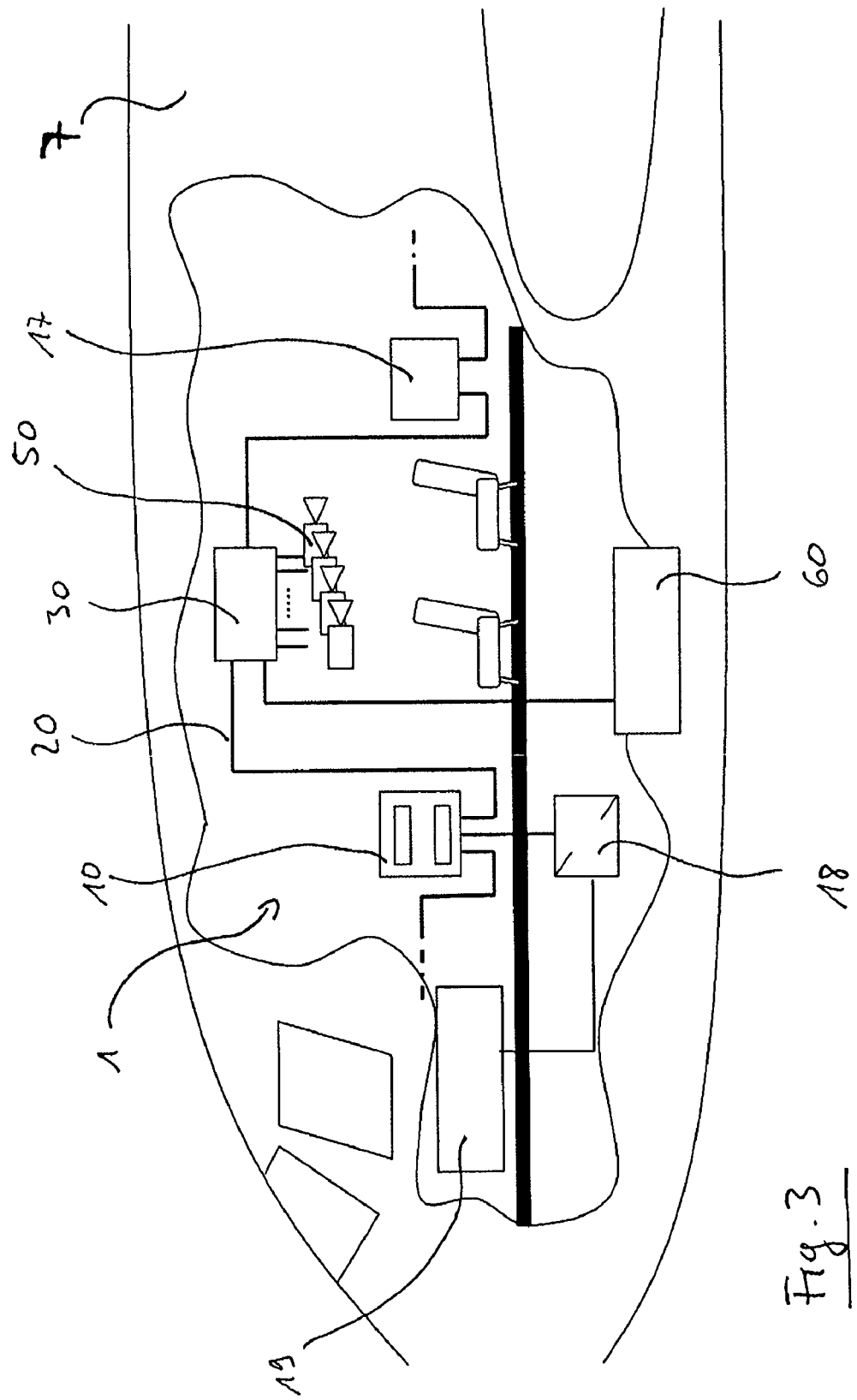
FIG. 3 shows the implementation of an inventive service network in an aircraft or an aircraft with an inventive service network, respectively.

FIG. 3 shows a service network 1 in an aircraft 7 or an aircraft 7 with a service network 1, respectively. This service network essentially consists of the service network that was respectively described above with reference to FIG. 1 and FIG. 2. The multi-purpose flight attendant panel 10 or an additional flight attendant panel 17 may be arranged in the passenger compartment of the aircraft. However, a flight attendant panel 10 may also be provided in a separate room for safety reasons, for example, in order to arrange a control device 11 provided therein or a memory 12 for recording data outside the immediate reach of passengers. The switch 30 that is connected to the flight attendant panel 10, 17 via a bus system 20 may be arranged at any location in the aircraft. The interfaces 31 make it possible to connect a multitude of recording devices 50 arranged in the cabin area, in this case video cameras, in order to realize the video monitoring of the cabin interior. The cockpit display device 19 may be arranged in the cockpit and connected at a suitable location of the service network, namely at the multi-purpose flight attendant panel 10 in the embodiment shown, for example, via a video interface 18. A ground service panel 60 makes it possible, for example, to access the service network 1 from outside the aircraft, for example, with the aid of a not-shown interface in the form of a plug connector or a radio link. Naturally, it would also be possible to realize an optical transmission, particularly an infrared or laser transmission. This makes it possible to also fulfill the function of the control device 11 from outside the aircraft by controlling and reading out the recording devices 50 via an external control unit such as, for example, a laptop that is connected to the ground service panel via the interface 61. The energy supply for the service network 1 can also be realized by this interface 61 and the ground service panel 60 such that the energy supply does not have to be ensured by the aircraft when the service network is controlled externally, but rather can be realized independently thereof from outside. The coupling to the energy supply can be realized, for example, with the functionality "Power over Ethernet," wherein this coupling for activating the switch or the switches and the cameras in the aircraft may be realized, if applicable, via a voltage transformer. This makes it possible to obtain the video data at a desired location of the aircraft in order to transmit this data to a ground station, for example, to a laptop, in the form of image data.

It should be noted that, in addition to aircraft, the present invention is also suitable, for example, for ships or trains, wherein the connection to a ground station naturally may also be realized in the form of a remote radio link such that the presence of personnel or equipment at the interface 61 is not absolutely imperative, particularly if the transport means are situated in inaccessible areas.

As a supplement, it should also be noted that "comprising" does not exclude any other elements or steps and that "a" or "an" does not exclude a plurality. It should furthermore be noted that characteristics or steps that were described with reference to one of the above embodiments can also be used in combination with other characteristics or steps of other above-described embodiments. The reference symbols in the claims should not be interpreted in a restrictive sense.

The invention claimed:

1. A service network for an aircraft, comprising:
   a multi-purpose flight attendant panel;
   a bus system;
   a switch; and
   an interface for a ground station;
   wherein the multi-purpose flight attendant panel and the switch are connected via the bus system, wherein the switch comprises an interface for at least one recording device, and wherein the multi-purpose flight attendant panel comprises a control device for controlling the recording device;
   wherein an energy supply of the recording device and of the switch is provided externally via the interface for the ground station.

2. The service network of claim 1, wherein the bus system is wire-bound.

3. The service network of claim 1, wherein the recording device comprises a video recording device.

4. The service network of claim 1, wherein the control device comprises a memory with video application software.

5. The service network of claim 1, wherein the multi-purpose flight attendant panel comprises a storage medium for recording data of the recording device.

6. The service network of claim 1, wherein the service network further comprises an additional flight attendant panel.

7. The service network of claim 1, wherein the service network further comprises a cockpit display device.

8. The service network of claim 1, wherein the service network further comprises a ground service panel that is connected to the bus system, and wherein the interface for a ground station allows a data exchange with the ground service panel.

9. An aircraft comprising a service network, the service network comprising:
 a multi-purpose flight attendant panel;
 a bus system;
 a switch; and
 an interface for a ground station;
 wherein the multi-purpose flight attendant panel and the switch are connected via the bus system, wherein the switch comprises an interface for at least one recording device, and wherein the multi-purpose flight attendant panel comprises a control device for controlling the recording device;
 wherein an energy supply of the recording device and of the switch is provided externally via the interface for the ground station.

* * * * *